United States Patent
Ramamurthy et al.

[11] Patent Number: 5,882,306
[45] Date of Patent: Mar. 16, 1999

[54] ULTRASOUND IMAGING METHODS AND SYSTEMS

[75] Inventors: Bhaskar Ramamurthy, San Jose; Ismayil Guracar, Redwood City; James Arenson, Woodside, all of Calif.

[73] Assignee: Acuson Corporation, Mountain View, Calif.

[21] Appl. No.: 833,953

[22] Filed: Apr. 11, 1997

[51] Int. Cl.$^6$ ....................................... A61B 8/00
[52] U.S. Cl. ........................................... 600/440; 600/441
[58] Field of Search .................................. 600/440–441, 600/449, 458–459; 424/9.52

[56] References Cited

U.S. PATENT DOCUMENTS

| | | |
|---|---|---|
| 4,712,037 | 12/1987 | Verbeek et al. . |
| 5,034,931 | 7/1991 | Wella ...................................... 367/126 |
| 5,111,823 | 5/1992 | Cohen . |
| 5,115,809 | 5/1992 | Saitoh et al. . |
| 5,255,683 | 10/1993 | Monaghan . |
| 5,285,788 | 2/1994 | Arenson et al. . |
| 5,287,753 | 2/1994 | Routh et al. . |
| 5,301,670 | 4/1994 | Sato et al. ............................... 600/441 |
| 5,313,948 | 5/1994 | Murashita et al. . |
| 5,358,466 | 10/1994 | Aida et al. . |
| 5,396,285 | 3/1995 | Hedberg et al. . |
| 5,410,205 | 4/1995 | Gururaja . |
| 5,410,516 | 4/1995 | Uhlendorf et al. . |
| 5,417,213 | 5/1995 | Prince . |
| 5,417,214 | 5/1995 | Roberts et al. . |
| 5,425,366 | 6/1995 | Reinhardt et al. . |
| 5,433,204 | 7/1995 | Olson . |
| 5,438,554 | 8/1995 | Seyed-Boloforosh et al. . |
| 5,443,071 | 8/1995 | Banjanin et al. . |
| 5,456,255 | 10/1995 | Abe et al. . |
| 5,456,257 | 10/1995 | Johnson et al. . |
| 5,469,849 | 11/1995 | Sasahi et al. ........................... 600/458 |
| 5,471,990 | 12/1995 | Thirsk . |
| 5,479,926 | 1/1996 | Ustuner et al. . |
| 5,526,816 | 6/1996 | Ardita ..................................... 600/458 |
| 5,560,364 | 10/1996 | Porter . |
| 5,577,505 | 11/1996 | Brock-Fisher et al. . |

(List continued on next page.)

FOREIGN PATENT DOCUMENTS

| | | |
|---|---|---|
| 0 357 164 | of 0000 | European Pat. Off. . |
| 0 770 352 A1 | 5/1997 | European Pat. Off. . |

OTHER PUBLICATIONS

Deborah J. Rubens, M.D., "Sonoelasticity Imaging of Prostate Cancer: In Vitro Results." Radiology, vol. 195, No. 2, 1995.

Fred Lee, Jr., M.D., "Sonoelasticity Imaging: Results in in Vitro Tissue Specimens." Radiology, vol. 181, No. 1 Oct. 1991.

Kevin J. Parker, PhD, et al., "Sonoelasticity of Organs: Shear Waves Ring a Bell." J. Ultrasound Med. 11 (1992).

William Armstrong, et al., "Position Paper on Contrast Echocardiography", Am. Soc. of Echocardiography, Jun. 6, 1994.

(List continued on next page.)

*Primary Examiner*—Francis J. Jaworski
*Attorney, Agent, or Firm*—Brinks Hofer Gilson & Lione

[57] ABSTRACT

An ultrasound imaging system generates a legend on a display device. This legend includes at least two axes and an array of display indicia, and the indicia are responsive to a mapping function used to generate a displayed ultrasonic image as a modulated, non-linear, multi-bit function of at least first and second image signals. At least one of the axes of the legend varies as a function of a B-mode value range. Preferably, one axis of the legend varies as a function of a fundamental image signal, and the other axis varies as a function of a harmonic image signal. The imaging system can be controlled such that a B-mode processor automatically alternates between a fundamental mode of operation and a harmonic mode of operation on a line-by-line, group-of-lines by group-of-lines, or frame-by-frame basis. A user selects the desired mapping function as one of a series of alternative mapping functions included in a selected family of mapping functions, and the user also selects the family of mapping functions from a plurality of available families.

19 Claims, 5 Drawing Sheets

U.S. PATENT DOCUMENTS

| | | |
|---|---|---|
| 5,579,768 | 12/1996 | Klesenski . |
| 5,579,770 | 12/1996 | Finger . |
| 5,588,435 | 12/1996 | Weng et al. . |
| 5,601,086 | 2/1997 | Pretlow, III et al. . |
| 5,617,862 | 4/1997 | Cole et al. . |
| 5,628,322 | 5/1997 | Mine ......................................... 600/458 |
| 5,632,277 | 5/1997 | Chapman et al. . |
| 5,706,819 | 1/1998 | Hwong et al. ........................... 600/458 |
| 5,724,976 | 3/1998 | Mine . |
| 5,740,128 | 4/1998 | Hossach et al. ......................... 367/138 |

OTHER PUBLICATIONS

Nico de Jong, "Physical properties and technical aspects of ultrasound contrast agents." (1 page).

Robert M. Lerner, et al., "'Sonoelasticity' Images Derived from Ultrasound Signals in Mechanically Vibrated Tissues." Ultrasound in Med. and Biol., vol. 16, No. 3, 1990.

J. Ophir, et al., "Elastography: A Quantitative Method for Imaging the Elasticity of Biological Tissues." Ultrasonic Imaging 13, (1991).

J.A. Hossack, et al., "Improving transducer performance using multiple active layers." SPIE vol. 1733 (1992).

Vokmar Uhlendorf, et al., "Nonlinear Acoustical Response of Coated Microbubbles in Diagnostic Ultrasound." IEEE 1994 Ultrasonic Symposium.

John A. Hossack, et al., "Improving the Characteristics of a Transducer Using Multiple Piezoelectric Layers." IEEE Transactions on Ultrasonics, Ferroelectrics, and Frequency Control, vol. 40, No. 2, Mar. 1993.

"HP Ultrasound Technoloqies—Viability." About HP Ultrasound Imaging, WWW document 1997.

Ted Christopher, "Finite Amplitude Distortion–Based Inhomogeneous Pulse Echo Ultrasonic Imaging." IEEE Transactions on Ultrasonics, Ferroelectrics, and Frequency Control, vol. 44, No. 1, Jan. 1997.

"Supplement to Journal of the American College of Cardiology." American College of Cardiology, $45^{th}$ Annual Scientific Session, Mar. 24–27, 1996 pp. 21A, 63A, 239–240A.

Yang–Sub Lee, et al., "Time–domain modeling of pulsed finite–amplitude sound beams." J. Acoustical Society of America, 97 (2), Feb. 1995.

Michalakis A. Averkiou, et al., "Self–demodulation of amplitude and frequency. Modulated pulses in a thermouisceus fluid", J. Acoustical Society of America, vol. 94, No. 5, Nov. 1993.

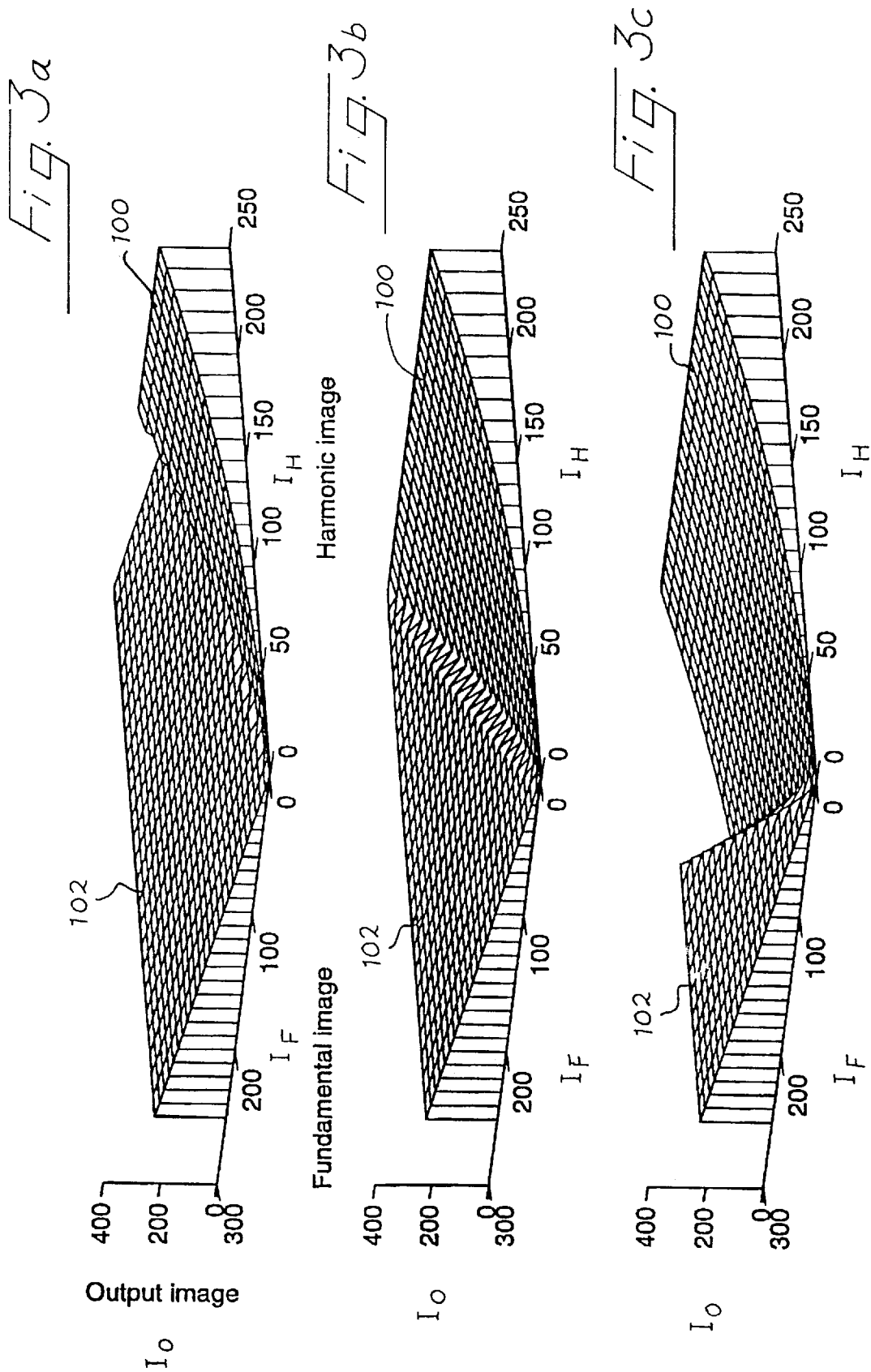

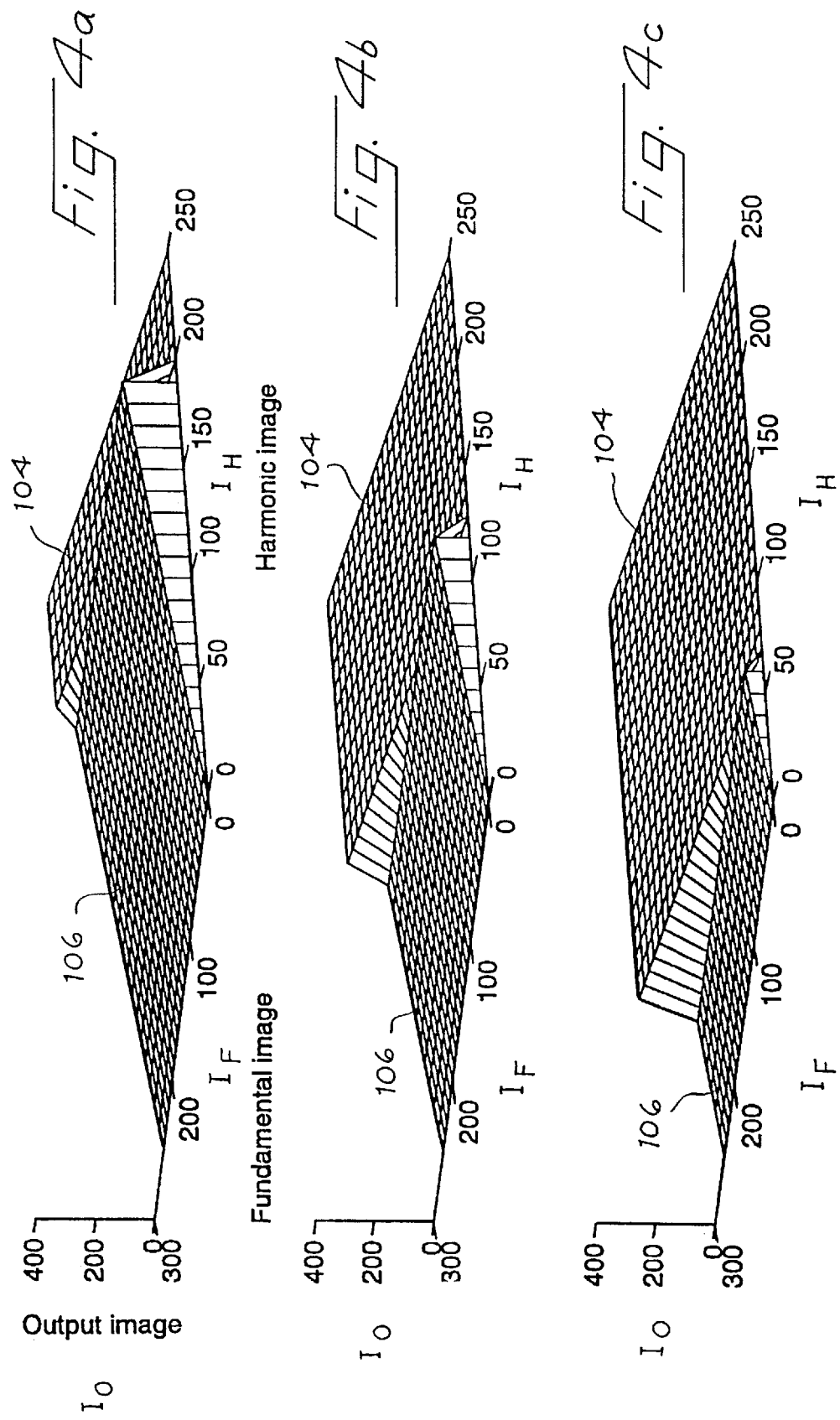

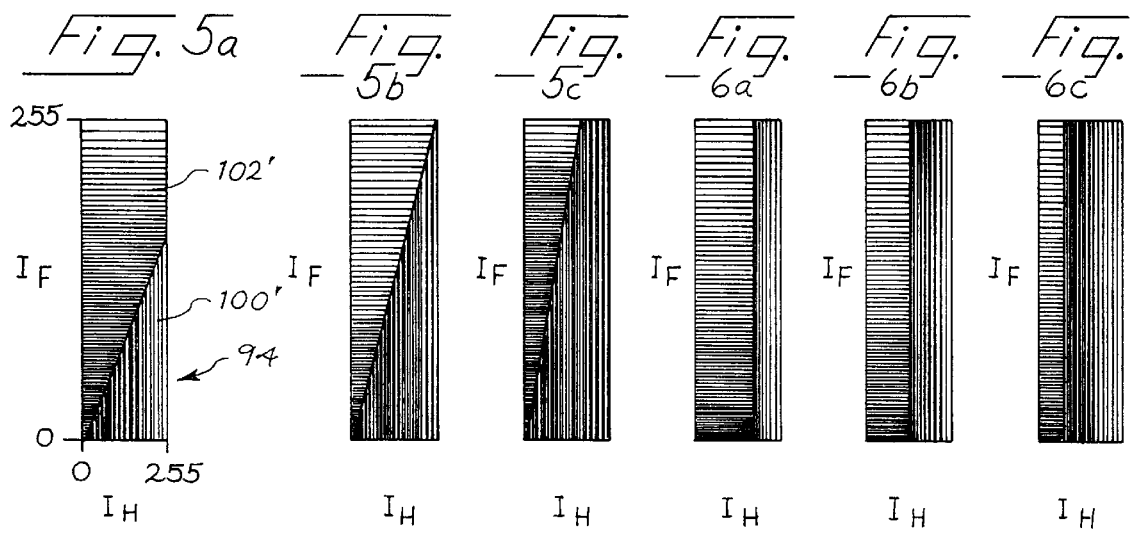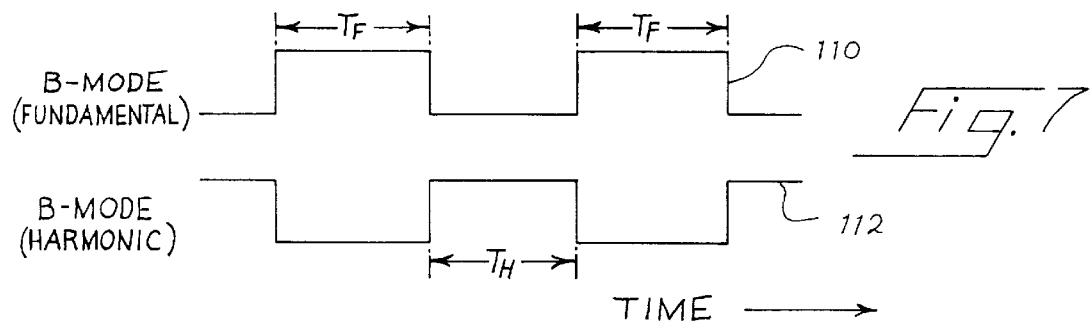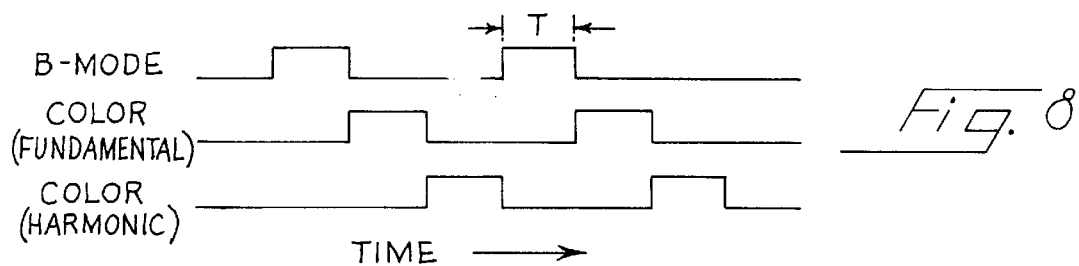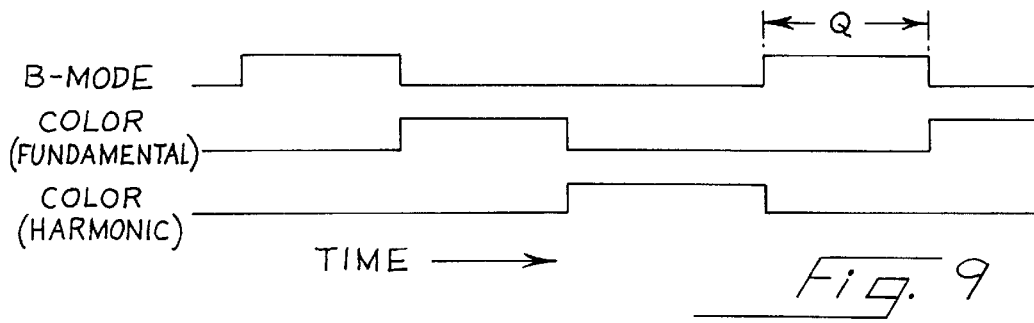

ULTRASOUND IMAGING METHODS AND SYSTEMS

BACKGROUND OF THE INVENTION

This invention relates to ultrasound imaging systems, and in particular to methods and systems for simultaneously displaying image information derived from multiple imaging modes.

Ustuner et al., U.S. Pat. No. 5,479,926, disclose a B-mode image enhancement method for combining a first image signal which has greater detail information and a second image signal which has greater contrast information, into a single image using a 2D look-up table. In one of the preferred embodiments, the second processed image can be obtained from a motion estimator which calculates the correlation coefficients between consecutive B-mode frames.

Arenson et al., U.S. Pat. No. 5,285,788, disclose a Doppler tissue imaging method (DTI) that uses color Doppler imaging means to image moving tissue. The disclosed DTI imaging can output tissue velocity, energy, or acceleration as a two-dimensional image which is spatially coordinated and superimposed on a B-mode image to display simultaneously the selected Doppler information and a tomographic image of the moving tissue. For Doppler tissue velocity imaging (DTV), the moving tissue velocity is the primary parameter to be displayed. Conventionally, a color map is used to encode the direction as well as the magnitude of the velocities, and a gray scale B-mode image signal may also be partially added to provide tomographic information of the moving tissue.

In the past, various contrast agents have been used to enhance contrast of blood and perfused tissues. Typically, a contrast agent is introduced into a part of the body which is to be ultrasonically imaged. For example, in the case of a blood-filled chamber of the heart, blood which carries contrast agent can be distinctly imaged by detecting the contrast agent.

Nonlinear scattering from contrast agents is described, for example, by V. Uhlenhdorf, et al., in "Nonlinear Acoustic Response of Coated Microbubbles in Diagnostic Ultrasound" (1995 Ultrasonic Symposium, pp. 1559–1562). Such contrast agents possess a fundamental resonant frequency. When the contrast agents are insonified with a high intensity ultrasonic energy at this fundamental frequency, they reflect and radiate ultrasonic energy at both the fundamental frequency and a harmonic of the fundamental frequency. For example, if insonified at a frequency of 2.5 MHz, the contrast agent may radiate energy at both 2.5 MHz (the fundamental frequency) and at 5.0 MHz (the second harmonic frequency).

Typically, non-linear contrast agents are used with an imaging system having a transmit beamformer that transmits ultrasonic energy and a receive beamformer that receives the reflected ultrasonic energy. The transmit beamformer insonifies the area to be imaged with ultrasonic energy at a fundamental frequency. When insonified with ultrasonic energy at the fundamental frequency, the contrast agent radiates energy at both the fundamental and harmonic frequencies as described above. The receive beamformer receives both the fundamental and harmonic energy, filters out the fundamental energy, and forms a harmonic image from the received harmonic energy. Ideally, the harmonic image relates only to the scattering from the contrast agent.

The harmonic image, however, may contain harmonic frequency components related to scattering from tissues in addition to the desired harmonic energy. For example, the transmit beamformer may transmit energy at the harmonic frequency as well as at the fundamental frequency. This energy scatters linearly and is included in the harmonic image. In addition, the receive beamformer may not completely filter out energy at the fundamental frequency, so this fundamental frequency leaks into the harmonic image. Finally, non-linear scattering from tissues or non-linear propagation through tissues may result in harmonic energy being scattered from normal tissues and included in the harmonic image, even in the absence of a contrast agent.

Brock-Fisher et al., U.S. Pat. No. 5,577,505, combine a colorized non-linear image with a gray-scale image. The non-linear image is obtained via a subtraction approach, requiring insonifing the tissue at two different times and power levels. Further, the combination includes only the simple steps of colorizing the non-linear signal and summing with the gray-scale image.

Monaghan, U.S. Pat. No. 5,255,683, combines a B-mode image taken before the introduction of a contrast agent with a subtraction image formed from images taken after a contrast agent has been introduced. Monaghan, however, requires images to be acquired before and after the introduction of a contrast agent. The scan is thus not in real-time, and the scan plane must be identical for each firing before and after the introduction of the non-linear contrast agent.

Conventional ultrasonic imaging system combine B-mode imaging modes and color Doppler imaging modes. Such systems usually have distinct signal paths for the B-mode and Doppler signals. Since different transmit and receive beams are required for regular B-mode imaging and color Doppler imaging, acquisition time is typically shared between the two modes. A typical acquisition sequence is to acquire one complete frame of B-mode information and then to acquire one complete frame of color Doppler information, alternating between the two modes. This method is conventionally referred to as "frame interleaving". Another typical acquisition sequence is to alternate between the two modes of imaging in a line by line sense, i.e., one line of B-mode information is collected followed by one line of color Doppler information. This mode of operation is called "line interleaving". Other modes of operation between these two interleaving techniques are also possible, i.e., many color Doppler lines may be collected between every pair of B-mode lines.

In the past, various legends have been displayed to inform the user of the mapping function currently being used to map measured signals to output image signals. For example, with conventional B-mode imaging, a one-dimensional legend that identifies display indicia such as gray-scale level with the range of values of the output B-mode signal has been displayed. Similarly, it is known to display a two dimensional legend that defines the display indicia of a mapping function for mapping two Doppler images (such as a color velocity image and a color energy image) into the displayed output image. Alternately, Doppler velocity and variance in Doppler velocity have been used as two axes of a mapping function that is displayed as a two dimensional legend.

Also, it is known to allow a user to select mapping functions in two stages, first by family of mapping functions, and then by individual mapping function contained within a previously selected family. Such techniques have been used in Doppler imaging systems where, for example, Doppler velocity and Doppler energy may be mapped to an output image, and where the user has been provided with means for selecting a mapping function family and an individual mapping function contained within a previously-selected family.

SUMMARY OF THE INVENTION

The broadest aspects of the present invention are defined by the following independent claims.

Generally, and without intending any limitation, a first aspect of the invention relates to the manner in which a two-dimensional legend is generated in an ultrasound imaging system of the type that generates an output ultrasonic image as a mapping function of at least first and second image signals. The generated legend comprises two axes and an array of display indicia, and these display indicia are responsive to the mapping function. A first one of the axes of the legend varies as a function of a B-mode value range characteristic of one of the first and second image signals. In the preferred embodiment described below, the first axis of the legend varies as a function of values of a fundamental image signal, and a second axis of the legend varies as a function of values of a harmonic image signal.

A second aspect of the invention relates to the manner in which a user can control a selected mapping function that maps at least first and second image signals to an output signal in an ultrasound imaging system. Means are provided for controlling at least the receive beamformer to generate fundamental and harmonic image signals of an imaged region. User-controlled means are provided for selecting the mapping function as one of a series of alternative mapping functions that are included in a set of mapping functions. User-controlled second selection means are provided for selecting the selected set of mapping functions from a plurality of alternative sets. In this way the user can readily select a desired mapping function for use in combining fundamental and harmonic images.

A third aspect of the invention relates to the manner in which an imaging system may be automatically controlled such that the B-mode processor automatically alternates between a fundamental mode of operation, in which the B-mode processor generates output signals indicative of portions of a first B-mode image characterized by a fundamental receive frequency, and a harmonic mode of operation, in which the B-mode processor generates output signals indicative of portions of a second B-mode image characterized by a harmonic receive frequency. In this way, the ultrasound imaging system automatically changes the mode of operation of the B-mode processor between a fundamental and a harmonic mode on a line by line basis, group-of lines by group-of-lines basis, or frame by frame basis as desired.

BRIEF DESCRIPTION OF THE DRAWINGS

FIGS. 3a–3c are graphical depictions of three mapping functions included in a first family of mapping functions.

FIGS. 4a–4c are graphical depictions of three mapping functions included in a second family of mapping functions.

FIGS. 5a–5c are graphical depictions of three two-dimensional legends corresponding to the mapping functions of FIGS. 3a–3c, respectively.

FIGS. 6a–6c are graphical depictions of three two-dimensional legends which correspond to the mapping functions of FIGS. 4a–4c, respectively.

FIGS. 7, 8 and 9 are timing diagrams showing three interleaving modes of operation.

DETAILED DESCRIPTION OF THE PRESENTLY PREFERRED EMBODIMENTS

Figure 1:
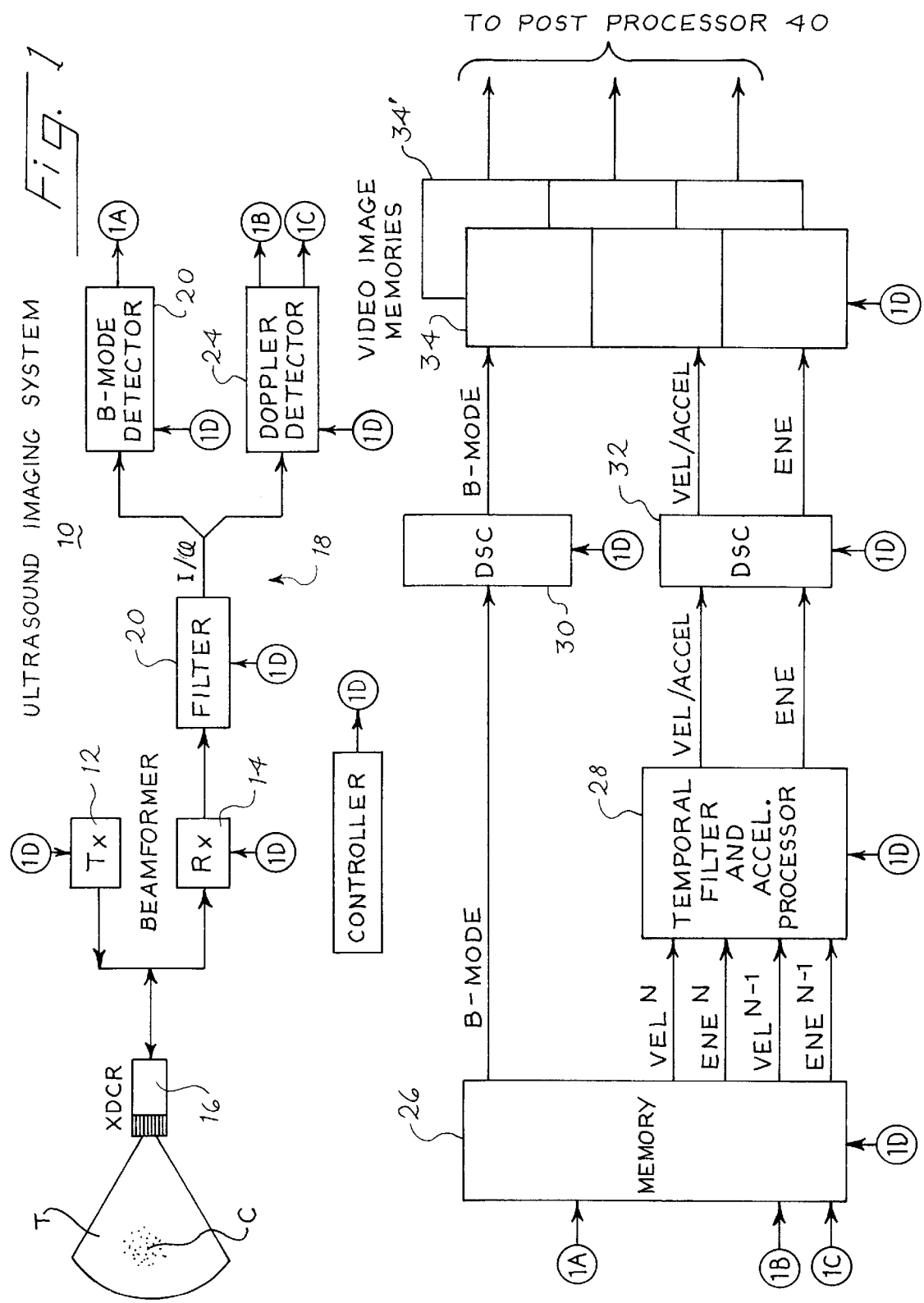
FIG. 1 is a block diagram of an ultrasound imaging system suitable for use with this invention.

Turning now to the drawings, FIG. 1 shows a block diagram of an ultrasound imaging system 10 that can be used to implement the present invention. The system 10 includes a transmit beamformer 12 and a receive beamformer 14 which are connected to an ultrasonic transducer 16. The transducer 16 converts transmit waveforms generated by the transmit beamformer 12 into sound energy which is then emitted along acoustic lines into a tissue T which may contain a contrast agent C. Acoustic energy reflected from the tissue T and optionally the contrast agent C is converted back to electrical signals by the transducer 16.

Receive signals generated by the transducer 16 in response to reflected energy from the tissue T and optionally the contrast agent C are formed into receive beams by the receive beamformer 14. The region covered by the receive beams will be referred to as an imaged region, and it may include blood, tissue, and optionally contrast agent. The receive beamformer 14 may be responsive to energy at the same frequency as that applied to the transducer by the transmit beamformer (the fundamental frequency) or to energy at a different frequency which may be harmonically related to the transmit frequency (a harmonic frequency). The beamformed signals generated by the receive beamformer 14 are applied as inputs to a signal processor 18. This signal processor includes a programmable filter 20 which can be used to isolate desired signals from undesired signals. For example, the filter 20 may be programmed to reject signals at the fundamental frequency and to pass signals at a desired harmonic frequency, or vice versa.

The filtered signals passed by the programmable filter 20 are preferably in I/Q format, and they are applied to a B-mode detector 22 and a Doppler detector 24. The B-mode detector 22 converts receive signals from the filter 20 into detected and log compressed image signals. The Doppler detector 24 estimates Doppler signal velocity and energy parameters.

The B-mode, Doppler velocity, and Doppler energy signals generated by the detectors 22, 24 are applied as inputs to a memory 26, which stores multiple frames of acoustic data in preparation for scan conversion in order to allow convenient alignment of B-mode and Doppler images and to facilitate cine playback.

A processing block 28 is provided to select and perform additional processing on the Doppler velocity and energy parameters read from the memory 26. The block 28 operates to place any one of the following three parameters on the velocity/acceleration channel:

1. Velocity from a particular frame (N);
2. Average velocity determined from two frames (N and N−1);
3. Acceleration obtained from the difference between the velocity in a particular frame and the velocity of the previous frame (N and N−1).

The block 28 also places any of the following two parameters on the energy channel:

1. Energy from a particular frame (N); and
2. Average energy formed by averaging the energy of two frames (N and N−1).

A temporal filtering function may be selected (the second parameter in each of the above lists) to reduce noise and other variations. Such filtering may make the resulting images more aesthetically pleasing.

Digital scan converters 30, 32 are provided for the B-mode signal from the memory 26 and for the velocity/ acceleration and energy signals from the processing block 28. The digital scan converters 30, 32 convert the respective signals from the acoustic grid to a raster grid suitable for display. If desired, the digital scan converters 30, 32 can be combined into a single scan converter if the reconstruction processing for the B-mode and Doppler information can be accomplished sequentially rather than in parallel. The B-mode detector 22 can be considered as forming a B-mode processor, and the Doppler detector 24 and the processing block 28 can be considered as a motion or Doppler processor.

The image signals supplied as outputs by the digital scan converters 30, 32 are stored in video image memories 34, 34'. Each video image memory 34, 34' includes separate sections for storing frames of scan converted image information for three separate parameters (B-mode image signals, velocity/acceleration image signals, and energy image signals). The two sets of memories 34, 34' are used in alternating fashion so that one set is used for display while the other is being updated. The sets of memories 34, 34' provide output signals to a post-processor and a display shown in greater detail in FIG. 2.

The operation of each of the major components of the system 10 is synchronized and controlled by a controller 50, which may take the form of one or more computers. For example, under control of the controller 50, the filter 20 may be programmed to pass fundamental or harmonic components of the receive signal. Similarly, the memories 34, 34' can be programmed to provide various combinations of image signals to the post-processor. In one mode of operation the memories 34, 34' provide B-mode, Doppler velocity or acceleration, and Doppler energy signals to the post-processor. In a second mode of operation the memories 34, 34' provide two separate B-mode image signals to the post processor, one formed from harmonic components, and the other from fundamental components of the receive signal.

The ultrasound imaging system 10 described above is merely one example of a suitable system, and many variations are possible. Both analog and digital ultrasound imaging systems can readily be adapted for use with this invention. For example, the Doppler detector 24 can take the form described in Arenson, U.S. Pat. No. 5,285,788, and further information regarding the Doppler detector 24 can be found in copending U.S. patent application Ser. No. 08/838,920 entitled "Ultrasound Imaging Enhancement Methods and Systems" filed on the same date as the present application and identified as Attorney Docket No. 5050/137. This copending application is hereby incorporated by reference in its entirety. The ultrasound imaging systems supplied by Acuson Corporation, the assignee of the present invention, under the tradenames Sequoia, Aspen, and 128XP can be adapted for use with this invention.

Figure 2:
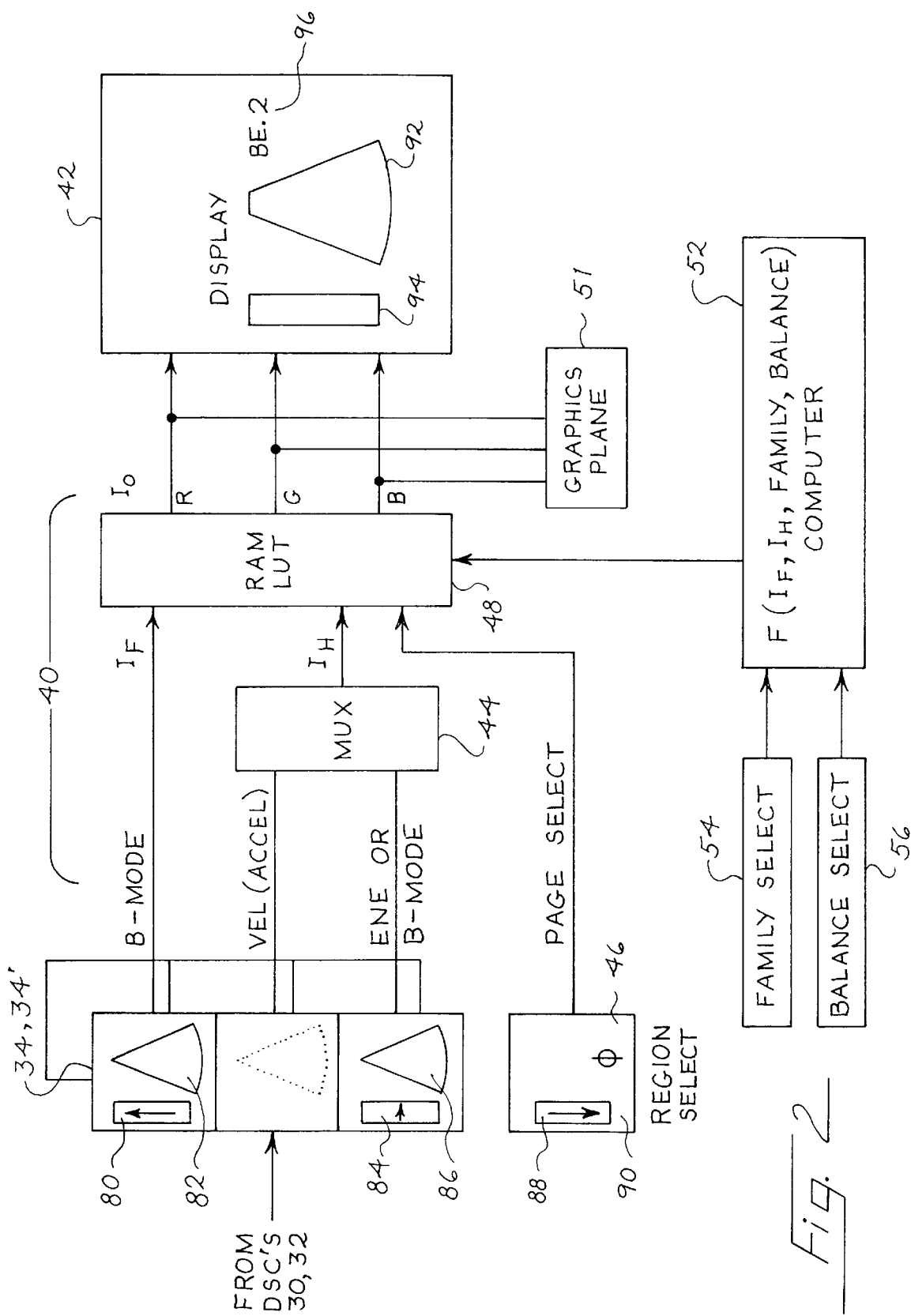
FIG. 2 is a block diagram of a post-processor and a display that incorporate a preferred embodiment of this invention.

Turning now to FIG. 2, this drawing shows details of a post processor 40 responsive to the memories 34, 34' and a display 42. In this embodiment the B-mode signals stored in the memory 34, 34' are applied to the look-up table 48 as an addressing signal $I_F$. The notation $I_F$ indicates that in this embodiment the B-mode signal is a fundamental image signal, in which the receive signal is formed from frequency components corresponding to the fundamental frequency components of the transmit signal. Similarly, the multiplexer 44 selects one of two image signals stored in the memories 34, 34'. In this embodiment the image signals that are applied as inputs to the multiplexer 44 can be two Doppler signals such as Doppler velocity or acceleration on the one hand, and Doppler energy on the other hand. Alternately, one of the input signals to the multiplexers 44 may be another B-mode signal.

The multiplexer 44 selects one of the two input image signals to provide a second addressing signal to the look-up table 48, $I_H$. The notation $I_H$ indicates that this image signal is a harmonic image signal, in which the image is formed from receive signals centered at a harmonic of the fundamental of the corresponding transmit signal. In alternate modes of operation the addressing signal $I_H$ may be a Doppler signal such as Color Doppler Velocity (CDV), Color Doppler Acceleration (CDA), Color Doppler Energy (CDE), Doppler Tissue Velocity, (DTV), Doppler Tissue Energy (DTE) or a B-mode signal. Further information regarding the generation of such Doppler signals is found in the above-identified co-pending U.S. patent application entitled "Ultrasound Imaging Enhancement Methods and Systems". Thus, the image signals $I_F$ and $I_H$ correspond to first and second image signals. Both of the image signals $I_F$, $I_H$ may be B-mode signals, or both may be Doppler signals in alternate embodiments. In each case, the image signals $I_F$, $I_H$ are limited to a range of values such as 0–255. In the case of a B-mode signal, this range of values will be referred to as a B-mode value range, and in the case of Doppler signals this range of values will be referred to as a Doppler value range. Various parameters may be used as input signals to the post processor 40 described above. For example, local mean, local variance, difference images, images formed with different frequencies, and integrated back scatter images can all be used for either or both of the signals $I_F$, $I_H$.

The look-up table 48 receives a third addressing input from a region select memory 46. In this embodiment the region select memory 46 includes a bit map which divides the region of the addressing signals $I_F$, $I_H$ into two sub-regions, indicated as sub-region 1 (reference numeral 88) and sub-region 0 (reference numeral 90). The addressing bit provide by the region select memory 46 in effect operates as a page selection bit that allows different portions of the look-up table 48 to be used for the sub-regions 1 and 0.

The look-up table 48 stores a mapping function that is addressed by the addressing inputs $I_F$, $I_H$ and page select. The corresponding location of the look-up table addressed by any combination of the three addressing inputs provides an output image signal $I_O$, which in this embodiment has three color components R, G and B. The output signals $I_O$ are supplied to the display 42 for display. The system of FIG. 2 also includes a graphics plane 51 that provides further information regarding alpha-numeric displays. This further information is combined with the output signal $I_O$ to cause the display of text on the display 42. Of course, the RGB color space is not required, and other color spaces such as the YUV color space can be used.

The look-up table 48 is programmable, and a computer 52 is provided to load the desired mapping function into the look-up table 48 under control of a family select device 54 and a balance select device 56. The family select device 54 allows a user to select one of a plurality of stored families of mapping functions, as described in detail below. For example, one family of mapping functions may use gray levels, while a second may use a red hue. The balance select device 56 allows a user to select an individual mapping function contained within a previously selected family. Once the user has controlled the select devices 54, 56 to select one desired mapping function, the computer 52 loads that mapping function into the look-up table 48.

As shown in FIG. 2, the scan converted frames stored in the memory 34, 34' can include multiple regions. For example, the B-mode detector 22, the memory 26, or the digital scan converter 30 of FIG. 1 may be programmed to form a ramp signal in a region 80 of the frame. This ramp signal in this preferred embodiment has a constant value in a horizontal direction at any given point along the ramp, and it increases linearly and monotonically along the vertical direction. The associated frame also includes an image signal 82 which depicts a measured ultrasonic image as detected by the B-mode detector 22. Thus, the addressing signal $I_F$ includes both a legend region corresponding to the ramp signal 80 and an image region 82. Similarly, a second frame stored in the memory 34, 34' includes a ramp signal stored in a legend region 84 and an image signal stored in a region 86. In this case the ramp signals stored in the legend region 84 has constant values in the vertical direction and values which increase monotonically throughout the entire value range of the associated image region 86 in the horizontal direction.

The output image signal $I_O$ from the look-up table 48 includes a two-dimensional legend 94 and an ultrasonic image 92. The two-dimensional legend 94 has two axes. One of the axes varies in accordance with the ramp signal 80 and the other of the axes varies in accordance with the ramp signal 84. The two-dimensional legend 94 displays an array of indicia that graphically represent a mapping function that is typically either identical to or closely related to the mapping function used for the ultrasonic image 92. In this embodiment at least one of the two axes of the two-dimensional legend 94 varies in accordance with a B-mode value range such as the B-mode value range associated with the fundamental image signal $I_F$. The other axis of the two-dimensional legend 94 varies in accordance with the value range of the image signal $I_H$, which in alternate embodiments may be a Doppler or a B-mode image.

FIGS. 3a–3c illustrate three mapping functions within a single family. In each case the mapping function has two orthogonal axes, one for the fundamental image $I_F$ and the other for the harmonic image $I_H$. The output image $I_O$ varies as a modulated, multi-bit, non-linear function of $I_F$ and $I_H$. In each of the mapping functions of the family shown in FIGS. 3a–3c the mapping function provides a transition between two separate regions. The individual mapping functions contained within the family place this transition at different places on the fundamental-harmonic plane. For example, the regions 100 of the mapping functions shown in FIGS. 3a, 3b and 3c may result in output signals of a first color such as red, and the regions 102 may result in output signals of a second color such as gray.

FIGS. 4a, 4b and 4c show a second family of mapping functions which again vary with $I_F$ and $I_H$ as discussed above. In this case again the mapping functions are multi-bit, non-linear, modulated functions having two-distinct regions 104, 106. The regions 104, 106 may again be shown in different colors in the output signal $I_O$, as for example in shades of blue for the region 104 and shades of gray for the regions 106.

A user can select an available mapping function (such as one of the mapping functions of FIGS. 3a–3c and 4a–4c) by appropriate use of the family select device 54 and the balance select device 56. For example, to select the mapping function shown in FIG. 4b, a user would first use the family select device 54 to select the gray-blue family of mapping functions, and then the balance select device 56 to select the mapping function of FIG. 4b from among the three mapping functions included in the previously selected family. The family select devices 54, 56 can take any suitable form, including hard keys, or soft keys of any suitable type. The computer 52 operates as a means for selecting a set of mapping functions in response to user operation of the family select device 54 and as a means for retrieving a selected mapping function from a previously selected set or family of mapping functions in response to user operation of the balance select device 56. In alternative embodiments, the available mapping functions may simply be stored in the look-up table 48, and the select devices 54, 56 may include a multiplexer or other suitable selection device for enabling the desired mapping function. In this way the need for a separate computer 52 can be avoided. In other alternatives, a single select device can be used to select the family and the individual mapping function. Another alternative is to use a programmed computer to retrieve a desired mapping function automatically.

FIGS. 5a–5c and 6a–6c show six alternative two-dimensional legends 94 corresponding to the mapping functions shown in FIGS. 3a–3c and 4a–4c, respectively. In each case the vertical axis shows the value range of the fundamental image signal $I_F$ and the horizontal range shows the value range of the harmonic image signal $I_H$. Thus, the lower portion of the fundamental axis is dark, indicating weak echo signals and the upper portion is bright indicating strong echo signals. In FIG. 6a the left-most part of the horizontal axis is dark (such as dark red) indicating weak echo signals, and the right-most part of the axis is bright (such as light red) indicating strong echo signals. FIG. 5a shows the value range (0 to 255 in each case) for both axes, and a similar convention can be used for the legends of FIGS. 5b, 5c and 6a–6c.

The two-dimensional legends shown in FIGS. 5a–5c and 6a–6c in this case correspond exactly to the corresponding mapping functions of FIGS. 3a–3c and 4a–4c, respectively. For example, the two-dimensional legend of FIG. 5a includes regions 100' and 102' which graphically depict the mapping function regions 100, 102 of the mapping function of FIG. 3a. In this case the region 100' varies in intensity in shades of red, and the region 102' varies in intensity in shades of gray.

It is not essential in all cases that the two-dimensional legend 94 correspond exactly to the mapping function for the ultrasonic image 92. As explained above, the region select memory 46 provides a page select bit to the look-up table 48 that can be used to discriminate between the first region 90 that includes information for the ultrasonic image 92 and the second region 88 that includes information for the two-dimensional legend 94. In this way separate look-up tables can be used for the ultrasonic image 92 and the two-dimensional legend 94. Generally, the look-up table used for the two-dimensional legend 94 will be related to and in most cases closely related to the look-up table used for the ultrasonic image 92. In this way, the user is provided with a legend that facilitates interpretation of the ultrasonic image 92.

From the foregoing it should be apparent that the memories 34, 34' and the look-up table 48 cooperate to form a means for generating a two-dimension legend on the display 42, wherein one axis of the legend varies with a B-mode value range. Many alternative systems are possible for generating such a two-dimensional legend. For example, the two-dimensional legend may be stored in a separate memory similar to the graphics plane 50 and selected by the computer 52 to correspond to the mapping function currently in use in the look-up table 48. In this way the need for ramp regions 80, 84 may be eliminated. Any suitable hardware or software may be adapted to provide the two-dimensional legend described above.

Also, it should be apparent that the display 42 acts as a means for displaying the two-dimensional legend in combination with the ultrasonic image. Any desired display can be adapted for this purpose, including a CRT, a flat panel display, or the like. The exemplary display shown in FIG. 2 combines a two-dimensional legend in 94 with an ultrasonic image 92 and text material 96. The text material 96 is supplied by the graphics plane 50.

The system 10 can be programmed to operate in various modes of operation to produce desired images. For example, as shown in FIG. 7 the system can be programmed to collect B-mode fundamental images and B-mode harmonic images in an automatically interleaved fashion. In this case, the controller 50 of FIG. 1 is programmed to automatically optimize the entire imaging system 10 for each separate mode of operation (the fundamental imaging mode and the harmonic imaging mode). Such optimization may include optimization of the operating parameters for the transmit beamformer 12, the receive beamformer 14, and the filter 20. Additional system parameters such as gain and other filters both pre and post detection may be optimized as well. Optimization of the transmit beamformer 12 may include adjustment of apodization, power, focusing, f-number, and pulse length parameters as well as other parameters defining the characteristics of the transmit pulses. Optimization of the receive beamformer 14 may include adjustment of apodization, receiver gain, focusing and f-number parameters, as well as other parameters relating to the receive signals. Other system parameters which may be optimized separately for the harmonic and fundamental imaging modes include parameters defining the operation of video filters, detection schemes, log compression, video gain, and the like. Preferably, the controller 50 is of the type that is capable of resetting all such system parameters relating both to beamforming and signal processing between adjacent acoustic lines. This can be done quickly by loading previously stored parameters into the correct memory locations of the various programmable components. Such controllers 50 are well known to those skilled in the art and therefore do not require detailed explanation here.

In FIG. 7, time interval $T_F$ on trace 110 is the time required to transmit, receive and process one complete B-mode acoustic line with system parameters tuned for the fundamental mode of operation. Immediately following this time interval, another time interval $T_H$ occurs where the system transmits and receives a beam that is optimized for harmonic imaging. The transmit and receive beam for the fundamental and harmonic imaging lines may or may not be at the same spatial location, as long as the spatial orientations of the lines are remembered for correct display. In this mode of operation the system 10 alternates between acquiring fundamental and harmonic image information along scan lines that span the entire region of interest. Once the entire frame of fundamental and harmonic information has been obtained, both images may be displayed at the same time as explained above. Of course, each mode of imaging (fundamental or harmonic) in this embodiment has a unique buffer to which the respective imaging data are processed and sent. This buffer may be positioned as desired in the signal processing path, but in the preferred embodiment described above is positioned in the video image memories 34, 34'. In this mode of operation the filter 22 is programmed to alternate automatically between a first state, in which it passes receive signals centered at the fundamental frequency of the corresponding transmit pulse, and a second state, in which it passes receive signals centered at a selected harmonic (such as the second harmonic) of the fundamental frequency of the associated transmit pulse. The output signals of the filter 20 are processed by the B-mode detector 22, and the scan converted, B-mode signals for both the fundamental and the harmonic image frames are stored in the video image memory 34, 34'.

According to this invention the controller 50 can be programmed to cause the system 10 to automatically alternate between fundamental B-mode imaging and harmonic B-mode imaging. In FIG. 7, B-mode fundamental imaging time periods are shown at $T_F$ in the upper curve 110, and B-mode harmonic imaging periods are shown at $T_H$ in the lower curve 112. The alternation between B-mode fundamental imaging and B-mode harmonic imaging can be performed on a line-by-line basis, a group-of-lines by group-of-lines basis or a frame-by-frame basis. The post-processor 40 uses the B-mode fundamental image as the addressing signal $I_F$ and the B-mode harmonic image as the addressing signal $I_H$ to create a combined ultrasonic image 92 that includes information from both images. Because the B-mode fundamental image information is collected in an interleaved fashion with the B-mode harmonic image information, excellent registration can be obtained between the two sets of image information.

In a second mode of operation illustrated in FIG. 8, the system 10 of FIG. 1 is controlled to interleave acquisition of three separate image signals: a B-mode image signal (which may be either at a fundamental or a harmonic frequency), a color image signal at a fundamental frequency (which may be color velocity, color energy, color acceleration, or some combination thereof) and a color image signal at a harmonic frequency (which again may be a suitable Doppler signal). The three image signals are acquired in a time interleaved fashion which preferably of the line-by-line type. As explained above, interleaving can also be performed on a group-of-lines by group-of-lines basis or a frame-by-frame basis. Of course, the time T can be different for each imaging mode. Once again, because of automatic interleaving, excellent image registration can be obtained. FIG. 9 is similar to FIG. 8, but it shows a third mode of operation in which the three image signals discussed in conjunction with FIG. 8 are interleaved on a frame-by-frame basis. In the mode of operation illustrated in FIGS. 8 and 9, the B-mode and Doppler processing paths provide the parallel paths for accomplishing the desired interleaving.

Of course, the foregoing detailed description has been provided to illustrate selected forms that the present invention can take, and is not intended to be limiting. Many alternatives are possible. For example, the image signals $I_F$, $I_H$ can be taken at any desired stage in the signal processing path, either before after scan conversion, and the look-up table 48 can in some embodiments be positioned upstream of the scan converters. The term "image signals" is therefore intended to be interpreted broadly to encompass both acoustic grid signals and raster grid signals. Also, the combination of the image signals $I_F$ and $I_H$ can be performed off line rather than in real time. One method to accomplish this includes the use of frame grabbers for the scan converted images and an off-line analysis package. Off line techniques can also use the results of different imaging operations to create the desired combined image. Moreover, more than two signals may be mapped to form the output signal, and the legend may have more than two axes. As another alternative, it is contemplated that the various image signals may be combined or mixed together at any suitable stage of the signal processing path to form either the addressing signal $I_F$ or the addressing signal $I_H$. With suitable mixing of this type the look-up table may be a one-dimensional table.

It is therefore intended that the foregoing detailed description be regarded as illustrative rather than limiting, and that it be understood that it is only the following claims, including all equivalents, that are intended to define the scope of this invention.

We claim:

1. In an ultrasound imaging system comprising a transmit beamformer, a receive beamformer, an ultrasonic transducer coupled to the beamformers, and a signal processor, said signal processor responsive to the receive beamformer and operative to generate an output ultrasonic image as a mapping function of at least first and second image signals, said first image signal comprising a set of B-mode values characterized by a B-mode value range, the improvement comprising:

means for controlling the imaging system to generate said first and second image signals from separate, respective transmit events; and means for generating a legend, said legend comprising at least two axes and an array of display indicia, said indicia responsive to the mapping function, wherein a first one of the axes of the legend varies as a function of the B-mode value range.

2. In an ultrasound imaging system comprising a transmit beamformer, a receive beamformer, an ultrasonic transducer coupled to the beamformers, and a signal processor, said signal processor responsive to the receive beamformer and operative to generate an output ultrasonic image as a mapping function of at least first and second image signals, the improvement comprising:

means for controlling the imaging system to generate a fundamental image signal of an imaged region and a harmonic image signal of the imaged region from separate, respective transmit events, said first image signal responsive to said fundamental image signal, and said second image signal responsive to said harmonic image signal, means for generating a legend, said legend comprising at least two axes and an array of display indicia, said indicia indicative of the mapping function, wherein a first one of the axes of the legend varies as a function of values of the fundamental image signal and a second one of the axes of the legend varies as a function of values of the harmonic image signal.

3. The invention of claim 1 wherein the second image signal comprises a set of Doppler values characterized by a Doppler value range, and wherein a second one of the axes of the legend varies as a function of the Doppler value range.

4. The invention of claim 1 wherein the second image signal comprises a set of harmonic values characterized by a harmonic value range, and wherein a second one of the axes of the legend varies as a function of the harmonic value range.

5. The invention of claim 4 wherein the first image signal is associated with a fundamental image.

6. The invention of claim 1 or 2 wherein the indicia graphically represent the mapping function.

7. The invention of claim 1 and 2 further comprising means for displaying the legend in combination with the output ultrasonic image.

8. In an ultrasound imaging system comprising a transmit beamformer, a receive beamformer, an ultrasonic transducer coupled to the beamformers, and a B-mode processor coupled to the receive beamformer, the improvement comprising:

means for controlling at least selected portions of the imaging system to cause the system to automatically alternate between a fundamental mode of operation, in which the B-mode processor generates output signals indicative of portions of a first B-mode image characterized by a fundamental receive frequency, and a harmonic mode of operation, in which the B-mode processor generates output signals indicative of portions of a second B-mode image characterized by a harmonic receive frequency, said fundamental and harmonic modes of operation comprising separate, respective transmit events.

9. The invention of claim 8 wherein the controlling means alters operating parameters for at least the transmit beamformer, the receive beamformer, and a filter included in the B-mode processor between the fundamental and harmonic modes of operation, thereby adapting imaging system operation separately for said modes.

10. The invention of claim 8 or 9 wherein the controlling means causes the B-mode processor to alternate between said fundamental and harmonic modes on a line-by-line basis.

11. The invention of claim 8 or 9 wherein the controlling means causes the B-mode processor to alternate between said fundamental and harmonic modes on a group-of lines by group-of lines basis.

12. The invention of claim 8 or 9 wherein the controlling means causes the B-mode processor to alternate between said fundamental and harmonic modes on a frame-by-frame basis.

13. The invention of claim 8 or 9 wherein the controlling means comprises a programmable filter interposed between the receive beamformer and the B-mode processor.

14. In an ultrasound imaging system comprising a transmit beamformer, a receive beamformer, an ultrasonic transducer coupled to the beamformers, and a signal processor responsive to the receive beamformer and operative to generate an output ultrasonic image as a selected mapping function of at least first and second image signals, the improvement comprising:

means for controlling at least the receive beamformer to generate a fundamental image signal of an imaged region and a harmonic image signal of the imaged region, said first image signal responsive to said fundamental image signal, and said second image signal responsive to said harmonic image signal;

user-controlled selection means for selecting the selected mapping function as one of a series of alternative mapping functions included in a selected set of mapping functions, for selecting the selected set of mapping functions from a plurality of available sets of mapping functions.

15. The invention of claim 14 wherein the selection means comprises:

a first selection device; and means for retrieving selected ones of the alternative mapping functions included in the selected set in response to user operation of the first selection device.

16. The invention of claim 15 wherein the selection means further comprises:

a second selection device; and means for selecting the selected set of mapping functions in response to user operation of the second selection device.

17. The invention of claim 14 further comprising:

means for generating a legend on a display device, said legend comprising at least two axes and an array of display indicia, said indicia responsive to the selected mapping function.

18. The invention of claim 17 wherein the indicia graphically represent the mapping function.

19. The invention of claim 8 wherein the controlling means alters operating parameters for at least the transmit beamformer between the fundamental and harmonic modes of operation, thereby adapting imaging system operation separately for said modes.

* * * * *

UNITED STATES PATENT AND TRADEMARK OFFICE
CERTIFICATE OF CORRECTION

PATENT NO. : 5,882,306
DATED : March 16, 1999
INVENTOR(S) : Bhaskar Ramamurthy et al.

It is certified that error appears in the above-indentified patent and that said Letters Patent is hereby corrected as shown below:

In Claim 7, line 1, change "and" to --or--.

Signed and Sealed this

Twenty-fifth Day of April, 2000

Attest:

Q. TODD DICKINSON

*Attesting Officer*    *Director of Patents and Trademarks*